No. 31,293.  PATENTED FEB. 5, 1861.
N. R. BALDWIN.
CART.
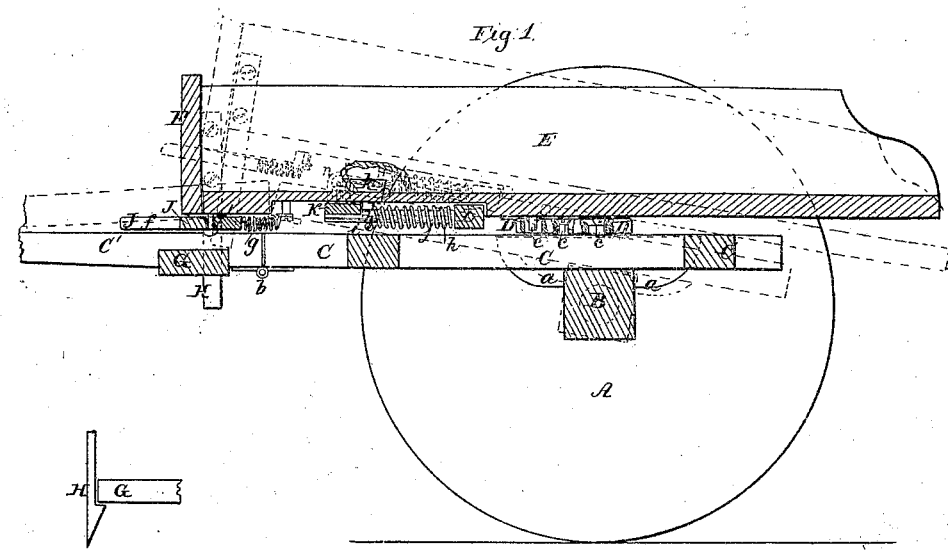
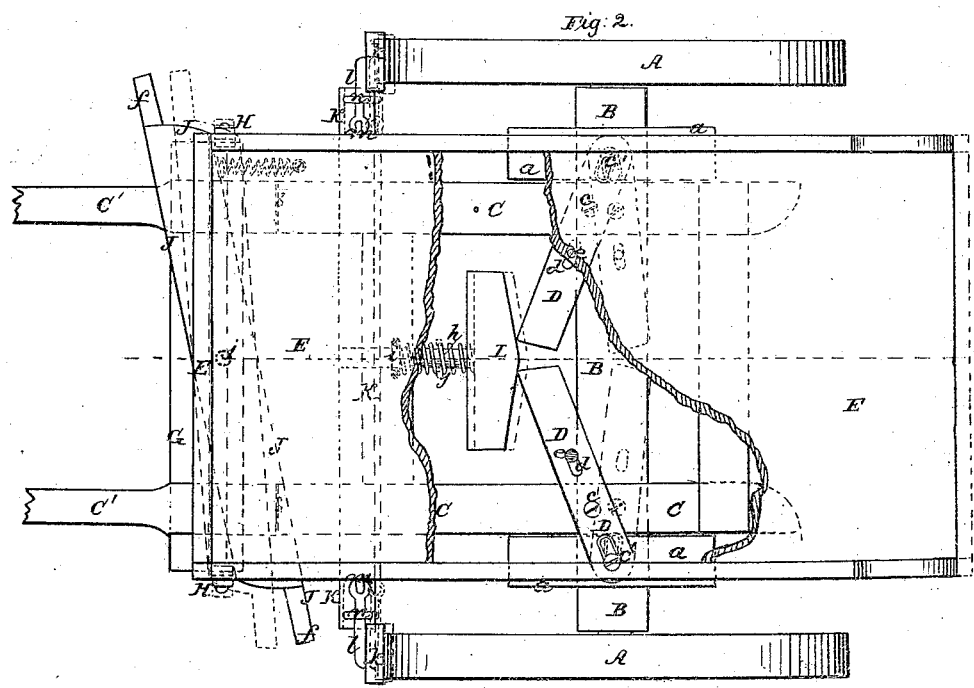
Witnesses
J W Coombs
R S Spencer
Inventor;
N R Baldwin
per ...
attorney

UNITED STATES PATENT OFFICE.

NORMAN R. BALDWIN, OF AFTON, NEW YORK.

CART.

Specification of Letters Patent No. 31,293, dated February 5, 1861.

*To all whom it may concern:*

Be it known that I, NORMAN R. BALDWIN, of Afton, in the county of Chenango and State of New York, have invented a new and Improved Cart; and I do hereby declare that the following is a full, clear, and exact description of the same, reference being had to the accompanying drawings, making a part of this specification, in which—

Figure 1, is a vertical longitudinal section through the improved cart, showing the body thereof in a condition to be upset or dumped. Fig. 2, is a top view of the improved cart, with a portion of the floor of the body broken out to exhibit the parts underneath the floor.

Similar letters of reference indicate corresponding parts in both figures.

This invention consists in attaching the bed of the cart body to two bolsters which are secured to the axle, as will be hereinafter described, by jointed levers which allow the bed to have a longitudinal motion on the axle; and in conjunction with this arrangement it consists in pivoting the cart body to the inner ends of the aforesaid levers so that when the horse is drawing the cart down hill the levers will move the cart body backward sufficiently far to counterbalance the downward increased pressure on the shafts, which are attached to the bed of the cart body and in going up hill the levers will move the cart body forward so as to bring the weight nearer to the horse, all as will be hereinafter described.

The invention consists secondly in attaching the brakes to a transverse bar which is under the bottom of the cart body and near its front end, and in applying to this brake bar a spring, or springs, which yield and operate to prevent jar and concussions in consequence of the brakes being applied to it, all as will be hereinafter described.

To enable those skilled in the art to make and use my invention I will proceed to describe its construction and operation.

A, A, are the two cart wheels, and B, the axle tree thereof, which are constructed in the usual manner. $a$, $a$, are two bolsters which are placed at each end of the axle tree B, inside of the wheels A, A, and pretty close to the wheels. These bolsters pass transversely across the axle tree and are securely bolted to it.

C, is the bed or frame on which the cart body is placed, consisting of two longitudinal bars connected by two cross bars. This bed C, is placed between the bolsters $a$, $a$, on the axle B, and it projects out from each side of the axle a suitable distance; and to the front ends of the longitudinal bars the shafts C′, C′, are jointed by horizontal transverse joints at $b$, $b$. This bed C, is attached to the two bolsters $a$, $a$, on the axle B, by the horizontal levers D, D, which are pivoted to the side bars of the bed at $c$, $c$, and to the bolsters $a$, $a$, at $c'$, $c'$. The latter pivots pass through longitudinal slots which are in the ends of the levers D, D, for allowing these levers to have an endwise play where the bed C, is given an endwise movement on the axle tree. The levers D, D, extend from their pivots to about the middle of the cart, and these inner ends move in a direction with the bed C, when this bed is moved.

$d$, $d$, are short longitudinal slots made through the levers near their inner ends, which receive the short studs $e$, $e$, projecting down from the bottom of the cart body E. These studs $e$, $e$, connect the cart body E, with the two levers D, D, when the cart body is resting on the bed, or rather the levers D, D, at these points, and cause the levers D, D, to operate upon the body E, and to move it in the direction which their inner ends move in.

The cart body E, is constructed in the usual manner of a dumping cart and it is attached at its front end to the cross tree G, of the shafts C′, C′, by two hooked springs or latches H, H, which project down from each side, and near the front end of the cart body, some distance below the bottom of the body, and catch under the ends of the cross tree G, and hold the front end of the cart body down securely to the shafts and also to the bed C, to which the shafts are jointed. These hooked springs H, H, and also the ends of the cross tree G, are made quite wide and do not become detached in consequence of the longitudinal play allowed the cart body.

J, is a flat bar which is secured by a central pivot joint J′, to the middle of the cart body E, at the front end and under the bottom thereof. The ends of this flat bar J, are curved obliquely and have handles $f$, $f$, projecting from them. This bar J, is used to distend the springs H, H, and detach their hook ends from the cross tree G, when it is desired to upset the body E, to throw out its load. The red lines in which bar J, is represented in Fig. 2, represent it in the position when its ends have forced each spring H, out from the end of cross tree G. A spring $g$, Fig. 1, is placed behind one end of this bar J, for the purpose of throwing out this end when the bar is released, and allowing the springs H, H, to fly back into their position for grasping the ends of cross tree G, when the front of the cart body is brought down on the shafts.

K, is a brake bar, which passes transversely across the bottom of the cart body E, and projects out a short distance from each side of this body. This bar K, is arranged in the front part of the cart body; and about the middle of the length of this bar and secured to it is a rod $h$, which passes through a staple $i$, secured into the floor of the body E, and carries a T piece or cross bar L, on its rear end as shown in Fig. 2. Between this T piece L, and the staple $i$, is interposed an helical spring $j$, which is around the rod $h$, and which acts against and keeps the bar K, back in its proper place and operates upon it to prevent a rigid application of the brakes to the wheels A, A.

The brake blocks or rubbers are attached to the ends of short rods $l$, $l$, which are secured to the sides of the cart body E, over the ends of brake bar K, by staples $m$, $m$, as represented in Fig. 2. The rods $l$, $l$, pass through the staples $n$, $n$, projecting up from the ends of the brake bar K, which keep said rods in their proper places over the ends of the bar K. Now when the brake bar is moved forward bodily, the staples $n$, $n$, on the ends of this bar also move the outer ends of the rods $l$, $l$, with their brake blocks $k$, $k$, forward, and relieve them from the peripheries of the wheels C, C, and when the brake blocks are applied to the wheels the blocks bear on the ends of bar K, but when the cart is moved backward the rods $l$, $l$, turn over and release the brake blocks or rubbers from the wheels.

The length of the two levers D, D, is such that their ends will bear against the cross bar L, and press the brake bar K, forward in going up hill, or when a very heavy load is in the cart.

From this description it will be seen that when the horse draws upon the shafts C', C', on a level load, and a heavy weight is in the cart body, the bed C, of the cart will be moved forward, which operation throws the cart body forward also by means of the levers D, D, the inner ends of which move in a direction with the cart bed C, on the axle tree B. When the ends of levers D, D, are thus thrown forward they act upon the piece L, and throw the brakes forward out of the way of the wheels. In descending a grade the operation of the levers D, D, is reversed and the cart body is moved backward so as to throw some of the load in the cart behind the axle to act as a counterbalancing weight and thus remove a great weight from the horse's back. The bar L, not being now operated upon by the levers D, D, and the cart body being held back by the horse, the brakes will be applied to the wheels and rub upon them with greater or less pressure, according to the force with which the horse holds back; the spring $j$, will now be brought into action and this spring will prevent a rigid application of the brakes to the wheels.

To dump, or upset the cart body E, the driver moves one end of the flat bar J, forward which causes the ends of this bar (J) to force apart the springs H, H, and thus release them from the cross-tree G. The cart body now being released from the shafts C', C', and these shafts being pivoted to the bed C, at $b$, the body E, can be upset as represented in red lines Fig. 1.

Having thus described my invention what I claim as new and desire to secure by Letters Patent is:—

1. The two pivoted levers D, D, connecting the movable bed or frame C, to the axle tree at $c'$, $c'$, and the cart body to the bed or frame C, at $e$, $e$, substantially as herein described.

2. In combination with the bed, C, having a longitudinal movement on the axle tree, the cross piece L, rod $h$, spring $j$, brake bar K, jointed rods $l$, $l$, staples $n$, $n$, and blocks or rubbers $k$, $k$, combined and operating together as and for the purposes herein set forth.

3. The bar J, pivoted to the front part of the cart body, springs H, H, and cross tree G, in combination with the jointed shafts C', C', as and for the purpose herein set forth.

NORMAN R. BALDWIN.

Witnesses:
 Geo. G. Lee,
 David I. Coy.